(12) United States Patent
Baskin

(10) Patent No.: US 11,434,947 B1
(45) Date of Patent: Sep. 6, 2022

(54) STAY ROD ASSEMBLY FOR A FLUID PUMP

(71) Applicant: CS&P Technologies LP, Cypress, TX (US)

(72) Inventor: Kennis Baskin, Cypress, TX (US)

( * ) Notice: Subject to any disclaimer, the term of this patent is extended or adjusted under 35 U.S.C. 154(b) by 353 days.

(21) Appl. No.: 16/747,331

(22) Filed: Jan. 20, 2020

(51) Int. Cl.
| F16B 35/04 | (2006.01) |
| F16B 5/02 | (2006.01) |
| F16B 35/00 | (2006.01) |
| F16B 19/02 | (2006.01) |

(52) U.S. Cl.
CPC ............ *F16B 5/0275* (2013.01); *F16B 19/02* (2013.01); *F16B 35/00* (2013.01)

(58) Field of Classification Search
CPC .............................. F16B 5/0275; F16B 19/02
USPC .................................................. 411/412, 426
See application file for complete search history.

(56) References Cited

U.S. PATENT DOCUMENTS

| 1,236,224 | A | * | 8/1917 | Stafford | F22B 7/16 |
| | | | | | 285/19 |
| 3,130,628 | A | * | 4/1964 | Blinn | B21B 31/04 |
| | | | | | 100/170 |
| 4,159,097 | A | * | 6/1979 | Strickland | E04G 17/0652 |
| | | | | | 249/43 |
| 4,192,621 | A | * | 3/1980 | Barth | F16D 1/033 |
| | | | | | 29/523 |
| 4,472,075 | A | * | 9/1984 | Forni | G02C 5/2281 |
| | | | | | 464/112 |
| 4,743,138 | A | * | 5/1988 | Goy | B25B 27/16 |
| | | | | | 411/63 |
| 5,616,009 | A | | 4/1997 | Birdwell | |
| 6,419,459 | B1 | * | 7/2002 | Sibbing | F04B 53/22 |
| | | | | | 417/360 |
| 6,910,871 | B1 | | 6/2005 | Blume | |
| 8,057,145 | B2 | * | 11/2011 | Dolan | F16B 5/0258 |
| | | | | | 411/24 |
| 2009/0025328 | A1 | * | 1/2009 | Hemminger | E04G 17/0644 |
| | | | | | 52/514 |
| 2012/0141305 | A1 | | 6/2012 | Landers | |
| 2015/0159647 | A1 | * | 6/2015 | Dille | F04B 53/144 |
| | | | | | 92/169.1 |
| 2018/0128300 | A1 | * | 5/2018 | Rosén | F16B 5/0275 |
| 2020/0018271 | A1 | * | 1/2020 | Hielscher | F02M 35/10354 |
| 2020/0032533 | A1 | * | 1/2020 | Colino Vega | E04G 17/065 |

FOREIGN PATENT DOCUMENTS

WO 2019/094622 A 5/2019

* cited by examiner

*Primary Examiner* — Gary W Estremsky
(74) *Attorney, Agent, or Firm* — Egbert, McDaniel & Swartz, PLLC

(57) ABSTRACT

A stay rod assembly for a fluid pump has a rod with the first threaded section at one end and a second threaded section at an opposite end thereof with a stud portion located between the first threaded section and the second threaded section, and a sleeve positioned over the stud portion of the rod. The stud portion is tapered so as to narrow diameter from the first threaded section to the second threaded section. The stud portion has no shoulders thereon. The rod is received in an interior of the sleeve.

5 Claims, 3 Drawing Sheets

STAY ROD ASSEMBLY FOR A FLUID PUMP

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to stay rods for fluid pumps. More particularly, the present invention relates to stay rod assemblies located between a power end and a fluid end of a fluid pump.

2. Description of Related Art Including Information Disclosed Under 37 CFR 1.97 and 37 CFR 1.98.

Hydraulic fracturing is the injection, under pressure, of water, sand, and/or other fluids within a well formation to induce fractures in a rock layer. Oil and gas drilling operators commonly use hydraulic fracturing, (or "fracking") to release petroleum and natural gas well as other substances from the rock layer. The high pressure injection creates new channels in the rock which can increase the extraction rates and ultimate recovery of fossil fuels. A hydraulic fracturing pump or "frac pump" is used to pump water, sand, gravel, acids, proprietary liquids and concrete into the well formation. The solids pumped down the hole into the fractures keep the fractures from closing after the pressure is released. Operators generally attempt to pump as much volume as possible at or above the pressure necessary to frac the well.

Fracking gas or oil wells is very expensive and generally charged by the hour. Because the formation may be located thousands of feet below the earth's surface, the pressures generated and required by frac pumps are substantial, sometimes exceeding 20,000 pounds per square inch (p.s.i.). At peak times, a given frac pump may operate for more than eight consecutive hours (with drive engines running) at as much as 2800 revolutions per minute (rpm). With gear changes, the pump generally runs between a low of 60 rpm to a high of as much as 300 rpm.

A frac pump comprises two major components: a power frame and a fluid end. The power frame and fluid end are held together by a group of stay rods. The power frame is driven by high horsepower diesel engines, electric motors, or turbine engines. Internally, a frac pump increases pressure within a fluid cylinder by reciprocating a plunger longitudinally within the fluid end cylinder. Conventional high pressure, high volume frac pumps have either three or five cylinders. Other designs may have more or fewer cylinder counts.

Reciprocating pumps used for cementing, acidizing, or fracking a well typically include multiple stay rods to connect and prevent relative movement between a power end and a fluid end of the fluid pump. In operation, a plunger is reciprocatingly driven into and out of the fluid end section for pumping fluids. However, the reciprocating motion of the plunger and the associated fluid pressure variation within the fluid end section can cause substantial cycling stresses in the stay rods and ultimately lead to failure. The variation amplitudes (changes between maximum stress and minimum stress) of the cycling stresses can limit the stay rod's longevity. Thus, there is a need for a stay rod that can secure the power end to the fluid end that is capable of withstanding the cycling stresses that fatigue stay rods and leads to ultimate failure of the stay rods. The failure leads not only to damage to the pump assembly, but also costly and unanticipated downtime for the reciprocating pump.

A problem that occurs with stay rods is the breaking, fracturing, or weakening of the stay rods during the installation of the nut onto a threaded section of the stay rod. Large amounts of torque are applied to the nut. This torque can be up to 2500 p.s.i. As such, a large force is applied to the threaded section of the stay rod. Typical stay rods of the past have included a shoulder adjacent to the threaded section. It was originally believed that the application the shoulder (which bears against the flange of the fluid end or the power end), would enhance the strength of the stay rod. Instead, the shoulder creates a stress point that can lead to fracturing. Fundamentally, during the application of large amounts of torque to the nut, elongation (pertaining to tensile strength) occurs between the threaded section and the shoulder. As such, these large torque forces are distributed over a relatively small distance from the end of the threads to the shoulder (approximately 4 inches). As a result, the threaded section could break away from the stud portion of the stay rod during the application of the nut. As such, a need has developed so as to distribute the tensile forces over a longer portion of the stay rod while maintaining structural integrity of the stay rod.

In the past, the threads formed on the stay rods were mechanically cut threads. Once again, cut threads resulted in sharp peaks and valleys in the threaded section. Upon the application of substantial torque to the threaded section, cracks or damage to the stay rod has occurred because of stress risers caused by the use of cut threads. As such, a need has developed so as to avoid the stress risers in the threaded section that occur because of mechanically cut threads.

FIG. 1 shows a fluid pump assembly with the stay rods applied thereto. The pump 11 has two principal parts, the power end and motor 13 and the fluid end 15. The power end 13 houses a motor which powers a series of piston/cylinders would provide the motive force used to drive the particular fluid being pumped through the internal chambers (not shown) of the fluid end 15. The stay rods are used to connect the power end 13 to the fluid end 15 of the hyper-pressure well service pump 11. The pump 11 has a pump motor face 19 on the power end 13 of the pump. The face 19 is arranged generally perpendicular to a surrounding support substrate. The face 19 of the power end 13 is spaced apart from a joining face 21 of the fluid end 15 by a plurality of stay rods 23 and 25.

Each of the stay rods 23 and 25 is an elongated unitary body having a first threaded end which is sized to be received in a mating threaded opening 31 in the motor face 19 provided in the power end of the pump and a second opposing threaded end which is sized to be received in a hole opening on the joining face 21 of the fluid end 15 of the pump. A pair of shoulders adjacent the opposing threaded ends generally define an intermediate body portion of the stay rod. Nuts 59 and 61 are secured to the threaded sections of the stay rod. As such, the shoulders of the stay rod will bear against the joining face 21 of the fluid end 15 and against the face 19 of the power end 13.

FIG. 2 illustrates the configuration of the stay rod 23 of the prior art as used in association with the fluid pump 11 shown in FIG. 1. It can be seen that the stay rod 23 has a first threaded section 32 and a second threaded section 34 at opposite ends thereof. A stud portion 36 extends between the first threaded end 32 and the second threaded end 34. A bearing surface 38 has a shoulder 40 facing the first threaded section 32. The stay rod 23 has a hex region 42 upon which a wrench can be applied. Another bearing area 44 is shown as located adjacent to the second threaded section 34. With reference to FIG. 1, the shoulder 40 of the bearing area 38 will bear against the face 19 of the power end 13. The shoulder 46 of the bearing area 44 will bear against the joining face 21 of the fluid end 15. As can be seen in FIG. 2, the use of the shoulders 40 and 46 will create a hard corner or stress riser adjacent to the stud portion 36. As such, when a large amount of torque is applied to the threaded section 32 and 34, the stress risers will create an area of weakness in the stay rod 23. As a result, fracturing and breakage can occur. As such, the torque applied to either of the threaded sections 32 or 34 will create elongations only extending to the shoulders 40 and 46. As such, the tensile strength of the stay rod 32 is comparatively minimized.

FIG. 3 shows another prior art stay rod assembly 60. Stay rod assembly 60 is a two piece construction having a rod 62 and a sleeve 64 positioned over the rod 62. The rod 62 is received within the interior 66 of the sleeve 64. The ends of the sleeve 64 serve to reduce stresses on the rod 62 by having an end bearing against the flange 68 of the fluid end of the fluid pump. Nut 70 is applied onto a threaded section at end 72 of the rod 62. The opposite end of the sleeve 64 can bear against the face of the power end. The end 74 is received within the face of the power end of the fluid pump.

FIG. 3 also shows that there is a shoulder 76 adjacent to the end 74 of the rod 62. Once again, the shoulder 76 can create stress risers along the rod 62 and can promote breakage. The rod 62 narrows in diameter and then widens in diameter along the length thereof. As such, this creates areas of weakness along the length of the rod 62. The threaded sections at the ends 72 and 74 appear to be of equal diameter. Furthermore, since the shoulder 76 of rod 62 is mounted within a receptacle area 78 at the end of the sleeve 64, further stress risers can occur in this area. While the stay rod assembly 60, as shown in FIG. 3, is a improvement on the stay rod assembly shown in FIG. 2, the stay rod assembly 60 still create stress risers that can cause a fracture or a breakage of the stay rod upon the application of large amounts of torque to the nut 70.

In the past, various patents have issued with respect to stay rod assemblies. In particular, U.S. Pat. No. 5,616,009, issued on Apr. 1, 1997 to J. C. Birdwell, describes a multi-cylinder, double-acting mud pump. A hydraulically-powered piston in a cylinder is connected with a piston rod which, in turn, drives a second piston in a cylinder adapted to pump fluid mud. The first piston is driven by hydraulic oil delivered under pressure to intake manifolds through an independently driven valving apparatus which times the delivery of the hydraulic fluid for the main power stroke and further times the discharge of the high hydraulic fluid for the return secondary power stroke.

U.S. Pat. No. 6,419,459, issued on Jul. 16, 2002 to R. N. Sibbing, shows a mounting assembly for mounting a pump to a fluid cylinder. This mounting assembly includes a tie rod threaded at one end and provides a second end drivingly engageable with a sleeve-like threaded section for clamping attachment directly on to the cylinder block by the direct engagement of the connector internally of the cylinder block.

U.S. Pat. No. 6,910,871, issued on Jun. 28, 2005 to G. H. Blume, teaches a valve guide and spring retainer assembly. These are used in a plunger pump housing and incorporates structural features for stress relief. The pump housing accommodates correspondingly-shaped valve guides and/or spring retainers that are internally fixed in place using one or more non-threaded spacers.

International Publication No. WO 2019/094622, published on May 16, 2019 to T. C. Ford, describes a stay rod for a pump. The stay rod includes a body extending from a first end portion to a second end portion that is opposite to the first end portion. The body has an exterior surface. The first end portion and the second end portion are configured to be secured to a power end section and a fluid end section, respectively, of the pump such that the stay rod holds the power end section and fluid end section together. The stay rod includes a corrosion-resistant layer covering at least a portion of the exterior surface of the body.

U.S. Patent Application Publication No. 2012/0141305, published on Jun. 7, 2012 to Landers et al., discloses a stay rod for a high-pressure oil field pump. The stay rods used in this oil pump have an elongated unitary body with a first threaded end which is sized to be received in a mating threaded opening provided in the motor face of the power end of the pump and a second opposing threaded end which is sized to be received in a mating opening provided on a joining face of the fluid end of the pump. The intermediate portion is of a greater relative diameter than either of its first and second threaded ends and is provided with a series of elongated flats which begin at the approximate juncture between a shoulder joining the second threaded end and extending in the direction of a shoulder joining the first threaded end.

U.S. Patent Application Publication No. 2015/0159647, published on Jun. 11, 2015 to Delle et al., provides a stay rod assembly for a reciprocating pump that includes a power section having a power source to reciprocate a plunger. A cylinder section has a chamber to receive the reciprocating plunger from the power section. The stay rod assembly secures the cylinder section to the power section. The stay rod assembly includes a stud and a sleeve. The stud has a first end, a second end, a middle portion extending between the first and second ends, and a shoulder between the first end and the middle portion. The shoulder surrounds the stud and has a first loading end adjacent to the shoulder and a second loading end adjacent to the second end of the stud. The sleeve is configured to be pre-compressed and to pre-tension the stud for reducing cycling stresses.

It is an object of the present invention to provide a stay rod assembly which avoids stress risers.

It is another object the present invention provide a stay rod assembly which has no shoulders.

It is another object of the present invention to provide a stay rod assembly which distributes applied torque over an entire length of the stay rod.

It is another object of the present invention to provide a stay rod assembly that reduces fracturing and breakage.

It is still further object of the present invention to provide a stay rod assembly which reduces the time and labor required for replacing broken stay rods.

It is still another object of the present invention to provide a stay rod assembly which utilized heat treating to improve the tensile strength of the stay rod.

It is a further object of the present invention to reduce metal fatigue.

It is still a further object of the present invention provide a stay rod assembly that is adaptable to various types of fluid pumps.

These and other objects and advantages of the present invention will become apparent from a reading of the attached specification and appended claims.

BRIEF SUMMARY OF THE INVENTION

The present invention is a stay rod assembly for a fluid pump. The stay rod assembly has a rod with a first threaded section at one end and a second threaded section at an opposite end the thereof. A stud portion extends between the first threaded section and the second threaded section. The stud portion is tapered so as to narrow in diameter from the first threaded section to the second threaded section. The stud portion has no shoulders thereon. A sleeve is positioned over the stud portion of the rod. The rod is received in an interior of the sleeve.

In the stay rod assembly of the present invention, the interior of the sleeve is also tapered such that an inner diameter thereof reduces in diameter from one end to another. This sleeve has one end adjacent to the first threaded section and an opposite end adjacent to the second threaded section. The rod has a keyway formed at an end of the second threaded section. The keyway is adapted to receive an installation tool therein. The keyway extends diametrically across the rod.

The first threaded section and the second threaded section are externally threaded. These external threads are rolled threads. In the preferred embodiment the present invention, the external threads are eight threads per inch. The rod has a first thread relief formed circumferentially around the rod in a location between the first threaded section and the stud portion. The rod also has a second thread relief formed circumferentially around the rod at a location between the second threaded section and the stud portion. Specifically, in the preferred embodiment of the present invention, the first threaded section has a diameter of two inches and tapers to the second threaded section having a diameter of 1¾ inches. A nut is affixed to the first threaded section.

The present invention also comprises a power end, a fluid end having a flange extending outwardly thereof, and a plurality of stay rods having one end affixed to the power end and an opposite end affixed to the flange of the fluid end. Each of the plurality of stay rods has a rod with the first threaded section at one end and a second threaded section at an opposite end with a stud portion extending between the first and second threaded sections. A sleeve is positioned over the stud portion of the rod such that the rod extends through an interior of the sleeve. A nut is affixed to the second threaded section. The stud portion has no shoulders thereon. The second threaded section extends through the flange of the fluid end so as to have a portion positioned between the flange and the fluid end. The sleeve has one end bearing against the power end and an opposite end bearing against the flange of the fluid end. The nut bears against the flange of the fluid end.

The stud portion is tapered so as to have a wide diameter adjacent the first threaded section and a narrow diameter adjacent to the second threaded section. The interior of the sleeve is also tapered so as to have a narrow inner diameter at the flange of the fluid end and a wide inner diameter at the power end. The first threaded section and second threaded section have an external threads thereon. These external threads are burnished rolled threads. The rod has a first thread relief formed circumferentially around the rod in a location between the first threaded section and the stud portion. The rod also has a second thread relief formed circumferentially around the rod in location between the second threaded section and the stud.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
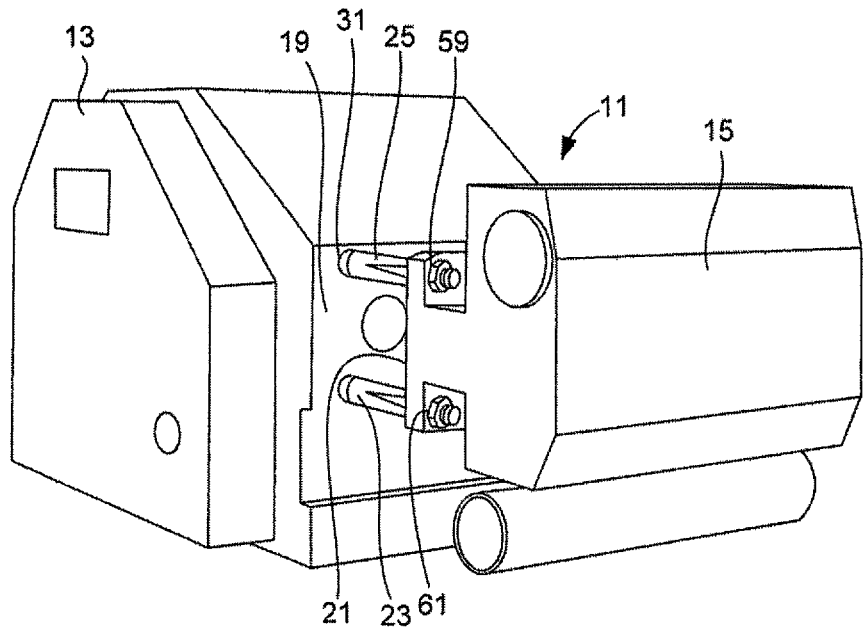
FIG. 1 is an upper perspective view showing a prior art fluid pump that employs stay rods between the power end and the fluid end of the fluid pump.
Figure 2:
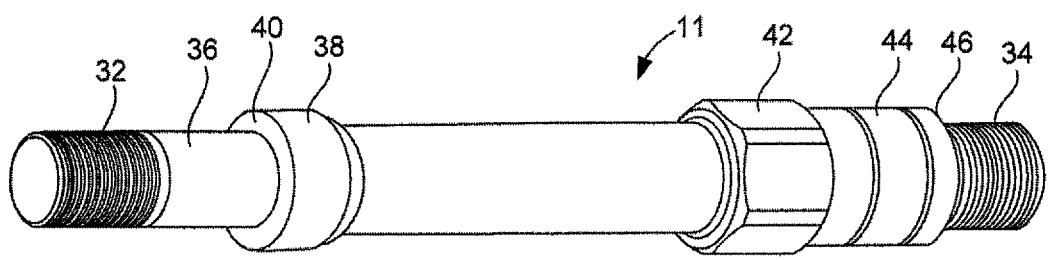
FIG. 2 is an upper perspective view of a prior art stay rod.
Figure 3:
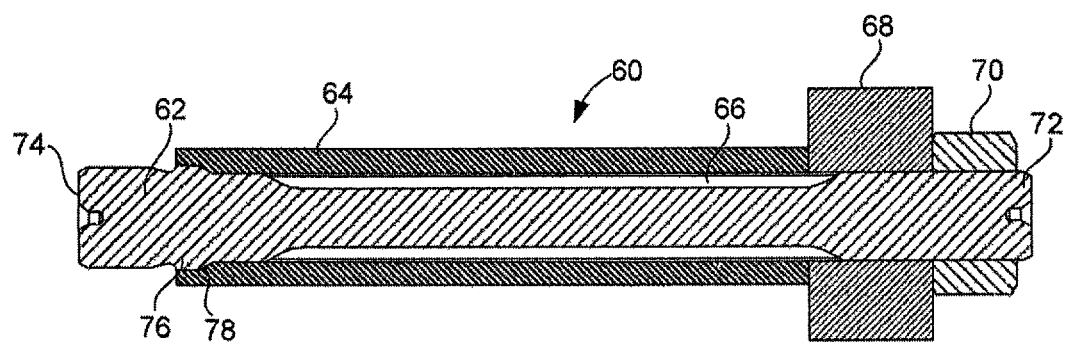
FIG. 3 is a cross-sectional view of another type of prior art stay rod.
Figure 4:
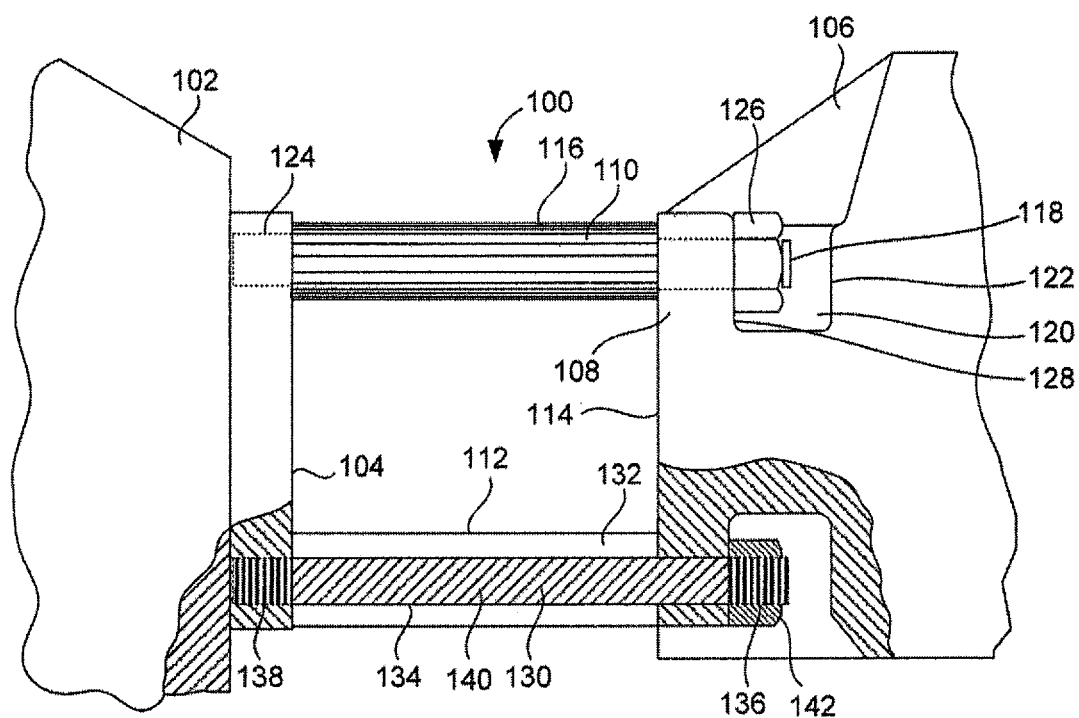
FIG. 4 is a side elevational view showing the stay rod assembly of the present invention as applied between the power end and the fluid end of the fluid pump.

FIG. 4 shows the fluid pump 100 of the present invention. The fluid pump 100 includes a power end 102 having a face 104 and a fluid end 106 having a flange 108 extending outwardly therefrom. Stay rods 110 and 112 extend between the face 104 of the power end 102 the face 114 of the flange 108 of the fluid end 106. Stay rod 110 is illustrated in side view. Stay rod 112 is illustrated in a cross-sectional view.

Stay rod 110 includes a sleeve 116 that has one end bearing against the face 104 of the power end 102 and an opposite end bearing against the face 114 of the flange 108. The sleeve 116 is annular so as to have a round outer diameter. The stay rod assembly 110 has a first threaded section 118 that in extends into a channel 120 located between the flange 108 and the inner face 122 of the fluid end 106. Stay rod assembly 110 also has a second threaded end 124 that is threadedly secured within the face 104 of the power end 102. A nut 126 is applied over the first threaded end 118 of the stay rod assembly 110 and bears against an inner face 128 of the flange 108.

FIG. 4 shows the second stay rod assembly 112 in cross-section. The stay rod assembly 112 includes a rod 130 upon which the sleeve 132 is applied. The rod 130 extends through the interior passageway 134 of the sleeve 132. The rod 130 has a first threaded section 136 at one end thereof and a second threaded section 138 at an opposite end thereof. A stud portion 140 extends between the first threaded section 136 and the second threaded section 138. As recited hereinbefore in association with the stay rod 110, sleeve 132 will have one end bearing against the face 114 of the flange 108 and an opposite end bearing against the face 104 of the power end 102. The first threaded section 136 has nut 142 affixed thereto. A torquing of the nut 142 will sandwich the flange 108 between the end of the sleeve 132 and a face of the nut 142. The second threaded section 138 is threadedly secured within a threaded opening at the face 104 of the power end 102.

Importantly in the present invention, it can be seen that the rod 130 of the stay rod assembly 112 has no shoulders thereon. The rod 130 is tapered so as to widen in outer diameter between the first threaded section 136 and the second threaded section 138. This taper is very gradual since, in the preferred embodiment, the first threaded section 136 will have a diameter of approximately 1¾ inches and the second threaded section 138 will have a diameter of approximately 2 inches. Each of the threaded sections is externally threaded and has eight threads per inch (in the preferred embodiment). It should be recognize that various other dimensions can be employed with respect to the rod 130, along with the threaded sections. The tapering of the stud portion 140 and the different diameters of the threaded sections 136 and 138 will allow the stay rod assemblies to be adaptable to various configurations of fluid pumps. In certain fluid pumps, the diameter of the openings on the flange of the fluid end are different than the diameter of the threaded holes in the power end. As such, the tapering of the rod accommodates the differences in size of these openings. Furthermore, the slight tapering of the stud portion 140 has been found to more optimally distribute strain forces along the entire length of the rod 130. As such, any elongation of the rod 130 will occur over the entire length of the rod 130, rather than over a length between any shoulder and the end of the rod. The distribution of these forces over the entire length of the rod will reduce or eliminate fracturing that can occur during the application of torque to the nut 142 onto the first threaded section 136. Further, the distribution of these forces over the entire length of the rod will reduce metal fatigue by dispersing the cyclic elongation and spring back of the metal within the rod from the action of the reciprocating plungers.

The sleeve 132 is also tapered on its inner diameter so as to widen in diameter from the end of the sleeve 132 at the face 114 of the flange 108 to the face 104 of the power end 102. The tapered interior of the sleeve 112 will generally conform to the taper of the rod 130.

Figure 5:
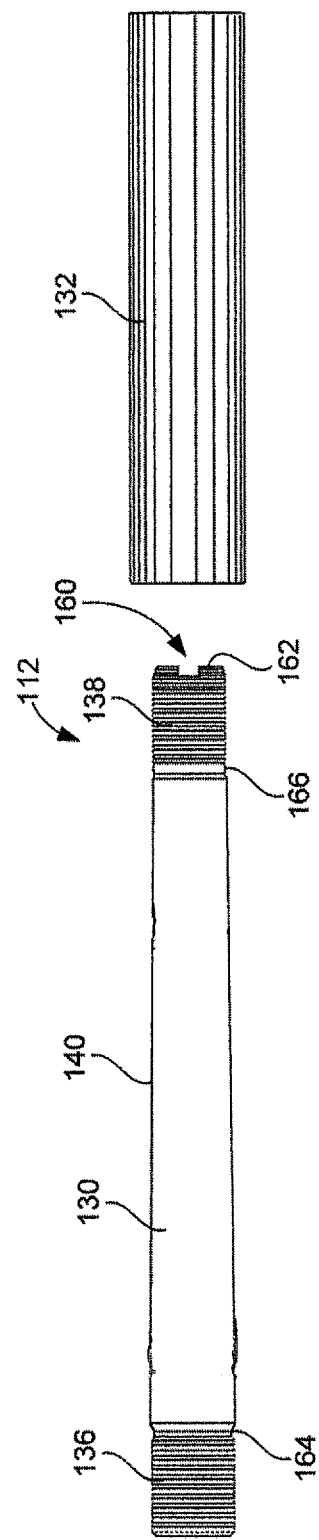
FIG. 5 is an exploded view showing the stay rod assembly of the present invention.

FIG. 5 is an exploded view of the stay rod assembly 112. The stay rod assembly 112 includes rod 130 having a first threaded section 136 and a second threaded section 138. The stud portion 140 is located between the first threaded end 136 and the second threaded end 134. It can be seen that the stud portion 140 narrows in diameter from the first threaded section 136 to the second threaded section 138. A keyway 160 is formed at the end 162 of the rod 130 at the end of the second threaded section 138. Keyway 162 is suitable for receiving a key of an installation tool so as to facilitate the installation of the first threaded end 136 into the threaded opening on the face of the power end.

FIG. 5 shows that there is a first thread relief 164 formed circumferentially around the rod 130 in a location between the first threaded section 136 and the stud portion 140. There is another thread relief 166 formed between the second threaded portion 138 and the stud portion 140. These thread reliefs 164 and 166 serve to reduce stress risers along the length of the rod 130.

The first threaded section 136 has external threads that are rolled threads. Rolled threads reduce the stress risers associated with cut threads. As such, the stress risers that can occur from the use of the cut threads of the prior art are reduced by the rolled threads of the present invention. LOCTITE™ can be applied to the external threads of the first threaded section 136. The stud portion 140 can be surface treated so as to eliminate surface imperfection-driven stress risers. A lot number can be applied to the stud portion 140 so as to allow the rod 32 to be traceable. The external threads on the first threaded section 136 has a two inch diameter and there are eight burnished threads per inch. The external threads of the second threaded section 138 also eight threads per inch and burnished rolled threads. The second threaded section 138 has a diameter of 1¾ inches. The sleeve 132 will have an interior that will receive the rod 130 therein. It is only necessary to slide the sleeve 132 over the rod 130 in order to complete the installation of the sleeve 132 on to the rod 130.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A fluid pump assembly comprising:
   a power end;
   a fluid end having flange extending outwardly thereof; and
   a plurality of stay rods having one end affixed to said power end and opposite end affixed to flange of said fluid end, each of said plurality of stay rods comprising:
      a rod having a first threaded section at one end and a second threaded section at an opposite end thereof, said rod having a stud portion between the second threaded section and the second threaded section, the stud portion having no shoulders thereon, the first threaded section extending through the flange of said fluid end so as to have a portion positioned between the flange and said fluid end;
      a sleeve positioned over the stud portion of said rod such that said rod extends through an interior of said sleeve, said sleeve having one end bearing against said power end and an opposite end bearing against the flange of said fluid end; and
      a nut threadedly affixed to the portion of said second threaded section, said nut bearing against the flange of said fluid end, the stud portion being tapered so as to have a wide diameter adjacent the first threaded section and a narrow diameter adjacent the second threaded section.

2. The fluid pump of claim 1, the interior of said sleeve being tapered so as to have a narrow inner diameter at the flange of said fluid end and a wide inner diameter at said power end.

3. The fluid pump of claim 1, the first threaded section and the second threaded section having an external threads thereon, the external threads being burnished rolled threads.

4. The fluid pump of claim 1, said rod having a keyway formed at an end of the second threaded section, said keyway adapted to receive an installation tool therein, said keyway extending diametrically across said rod.

5. A fluid pump assembly comprising:
   a power end;
   a fluid end having flange extending outwardly thereof; and
   a plurality of stay rods having one end affixed to said power end and opposite end affixed to flange of said fluid end, each of said plurality of stay rods comprising:
      a rod having a first threaded section at one end and a second threaded section at an opposite end thereof, said rod having a stud portion between the second threaded section and the second threaded section, the stud portion having no shoulders thereon, the first threaded section extending through the flange of said fluid end so as to have a portion positioned between the flange and said fluid end;

a sleeve positioned over the stud portion of said rod such that said rod extends through an interior of said sleeve, said sleeve having one end bearing against said power end and an opposite end bearing against the flange of said fluid end; and a nut threadedly affixed to the portion of said second threaded section, said nut bearing against the flange of said fluid end, said rod having a first thread relief formed circumferentially around said rod in a location between the first threaded section and the stud portion, said rod having a second thread relief formed circumferentially around said rod in a location between the second threaded section and the stud portion.

* * * * *